United States Patent [19]

Ohmi et al.

[11] Patent Number: 5,617,374

[45] Date of Patent: Apr. 1, 1997

[54] SIGNAL DETECTION DEVICE AND CLOCK RECOVERY DEVICE USING THE SAME

[75] Inventors: Shinichiro Ohmi; Hitoshi Takai, both of Toyono-gun; Yoshio Urabe, Ibaraki, all of Japan

[73] Assignee: Matsushita Electric Industrial Co., Ltd., Osaka, Japan

[21] Appl. No.: 489,276

[22] Filed: Jun. 9, 1995

[30] Foreign Application Priority Data

Jun. 14, 1994 [JP] Japan .................................. 6-132245

[51] Int. Cl.$^6$ .............................. G04B 47/00; H03K 5/13; H04L 7/10
[52] U.S. Cl. ............................. 368/10; 368/113; 327/48; 327/147; 375/327; 375/375
[58] Field of Search ............................ 368/10, 113, 118; 327/48, 147; 375/327, 375

[56] References Cited

U.S. PATENT DOCUMENTS

| | | | |
|---|---|---|---|
| 4,504,960 | 3/1985 | Yamada | 375/94 |
| 4,882,546 | 1/1989 | Takamura et al. | 329/310 |
| 4,982,110 | 1/1991 | Yokegawa et al. | 307/269 |
| 5,003,557 | 3/1991 | Fujiyama | 375/108 |
| 5,260,841 | 11/1993 | Suzuki et al. | 360/51 |
| 5,471,502 | 11/1995 | Ishizeki | 375/576 |
| 5,528,598 | 6/1996 | Baba et al. | 531/1 A |

FOREIGN PATENT DOCUMENTS

| | | |
|---|---|---|
| 62-48129 | 3/1987 | Japan . |
| 1-240024 | 9/1989 | Japan . |
| 4-51618 | 2/1992 | Japan . |
| 4-119736 | 4/1992 | Japan . |

Primary Examiner—Vit W. Miska
Attorney, Agent, or Firm—Wenderoth, Lind & Ponack

[57] ABSTRACT

A time window detection portion 3a outputs a time window detection pulse from a time window signal generated in a time window generating portion 2a and a zero-cross detection pulse detected in a zero-cross detection portion 1a. First and second phase storage portions 4a and 5a store output phase values of a phase counter 22 for different times as first and second phase values, respectively. A center phase computing portion 6a computes a first center phase value from the first and second phase values and a center phase storage portion 7a stores the first center phase value of the last time as a second center phase value. An approximation detection portion 8a determines whether the first and second center phase values are approximate or not and outputs an approximation detection pulse when they approximate. A frequency determination portion 20 determines whether a data signal is included in the input signal or not on the basis of frequency of detection of the approximation detection pulse with respect to the zero-cross detection pulse computed in a frequency computing portion 17.

19 Claims, 9 Drawing Sheets

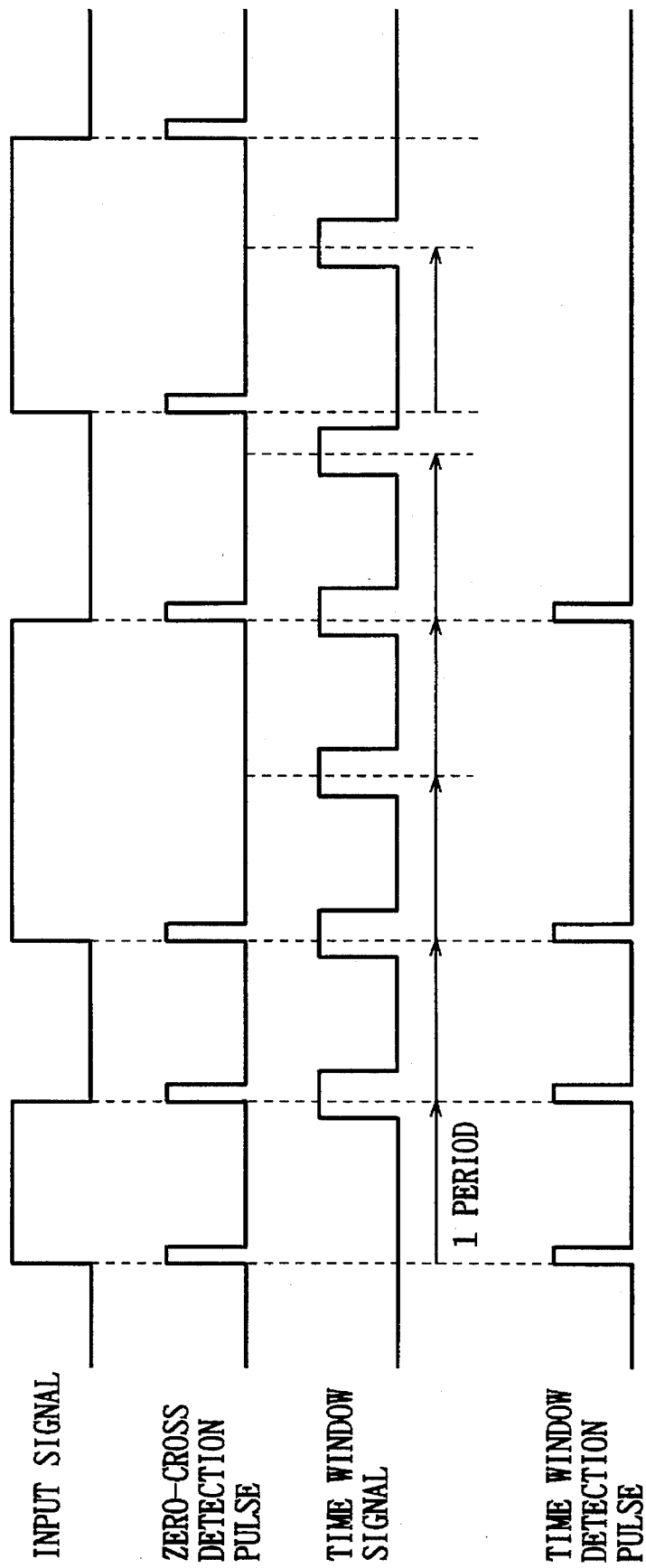

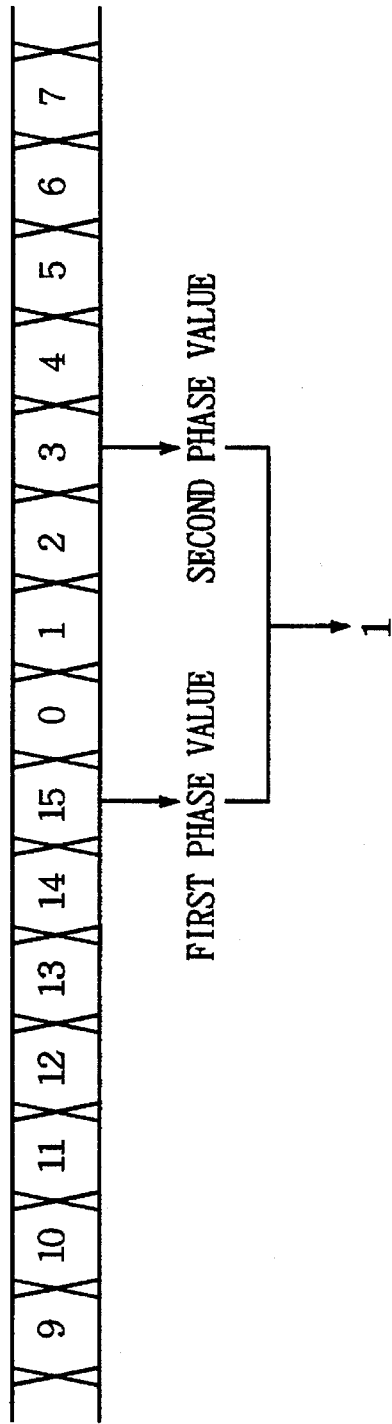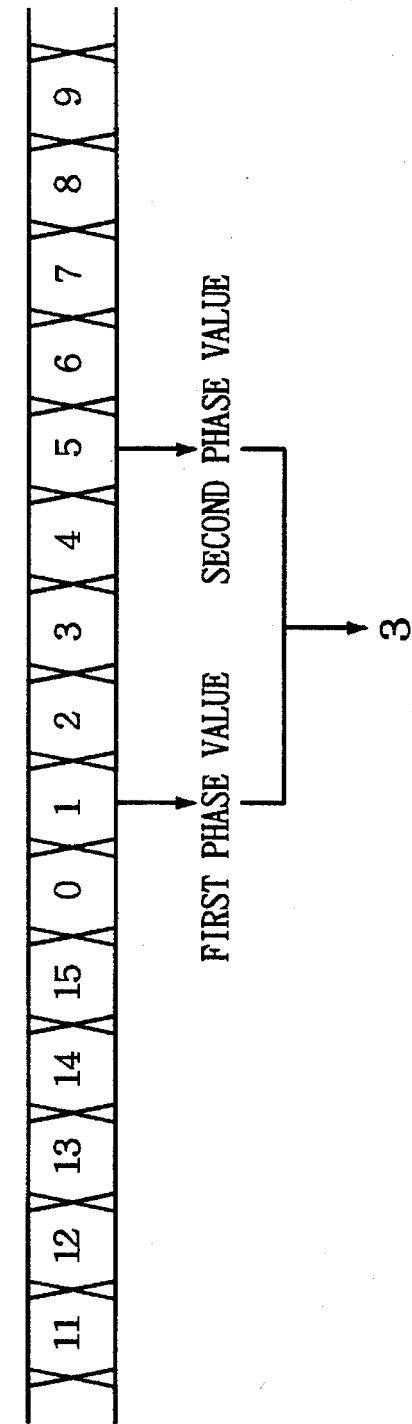

SIGNAL DETECTION DEVICE AND CLOCK RECOVERY DEVICE USING THE SAME

BACKGROUND OF THE INVENTION

1. Field of the Invention

The present invention relates to signal detection devices and clock recovery devices using the same, and in particular to a signal detection device for determining whether data is received or not when performing the digital communication in burst and a device for capturing the burst data at high speed to recover the clock which is synchronized with data symbol.

2. Description of the Background Art

Recently, the main structures of the communication equipments are mostly digitalized and a large number of multiplex systems, such as the time division system and the packet transmission system, are appearing which make good use of characteristics of the digitization.

Generally, in the reception of the burst signals (signals which are intermittently transmitted in short packets), signal detection is done by measuring levels of the receiving signals and determining that the signals are received when the levels are high. (Refer to Japanese Patent Laying-Open No.4-051618) Also, the recovery clock is made using the so-called Phase-locked Loop (referred to as PLL, hereinafter) (Refer to Japanese Patent Laying-Open No.4-119736.) That is to say, in the preamble pattern stored in the head of a data packet, a phase error between a data symbol and an oscillation output (i.e., recovered clock) of a voltage controlled oscillator is detected and fine adjustment of phase of the voltage controlled oscillator is made on the basis of the detected phase error to synchronize the oscillation output of the voltage controlled oscillator with the data symbol.

However, in such a conventional method, when receiving such signals as subjected to the time-division multiplex, it was difficult to detect data signals when the receiving signal level is near the noise level. Furthermore, when recovering clocks using the PLL, the loop time constant must be set long to prevent unstable operation in the PLL. Accordingly, long preamble pattern must be stored in the heads of data packets, which gives rise to a problem that the storage areas for the information data are short.

SUMMARY OF THE INVENTION

Accordingly, it is an object of the present invention to provide a signal detection device capable of certainly detecting presence/absence of a burst signal even if the receiving signal level is low) and a clock recovery device capable of high speed synchronization even with short preamble pattern and having high stability.

In a signal detection device in a first aspect of the present invention, a zero-cross detection pulse is generated by extracting zero-cross timing of an input signal. On the basis of the zero-cross detection pulse as time reference, a time window signal defining a time window with a certain period is generated. Further, the zero-cross detection pulse which passes the time window defined by the time window signal is extracted as a time window detection pulse. Then, a determination is made as to whether a data signal is included in the input signal on the basis of frequency of the time window detection pulse relative to the zero-cross detection pulse. The number of outputs of the time window detection pulse decreases when no data signal is received due to the characteristics of random zero-cross intervals, and it increases when the data signal is received because the zero-cross intervals become regular. Accordingly, it can be correctly determined whether the data signal is detected or not on the basis of the frequency of the time window detection pulse relative to the zero-cross detection pulse. That is to say, presence/absence of the data signal can be correctly detected irrespective of receiving signal level.

In the first aspect described above, the zero-cross detection pulse, the time window signal and the time window detection pulse may be generated for each of a plurality of input signals to determine whether a data signal is included in the respective input signals on the basis of the frequency of each time window detection pulse with respect to each zero-cross detection pulse. With such structure, a single signal detection device can deal with a plurality of input signals inputted at the same time. Consequently, the entire device can be downsized and phase information of a plurality of signals can be used, and therefore correcter signal detection can be made at higher speed.

In a signal detection device in a second aspect of the present invention, a phase counter performs counting operation at an integer multiple of a symbol rate of an input signal and cyclically outputs phase values with a certain period. The phase value outputted from the phase counter is stored as a first phase value in response to the zero-cross detection pulse, and a first phase value of the last time is stored as a second phase value. A first center phase value is computed from the first and second phase values and the first center phase value of the last time is stored as a second center phase value. If these first and second center phase values are approximate, an approximation detection pulse is outputted. Then, on the basis of the frequency of the approximation detection pulse with respect to the zero-cross detection pulse, it is determined whether a data signal is included in the input signal. The number of outputs of the approximation detection pulse decreases due to the characteristics that the zero-cress intervals become random when no data signal is received, and to the contrary, it increases as the zero-cross intervals become an integer multiple of one period of the phase counter when the data signal is received. Therefore, it can be exactly determined whether the data signal is detected or not from the frequency of the approximation detection pulse relative to the zero-cross detection pulse. That is to say, presence/absence of the data signal can be exactly detected irrespective of the strength of the receiving signal level.

In the above-described second aspect, the zero-cross detection pulse and the approximation detection pulse may be generated for each of a plurality of input signals to determine whether the data signal is included in each of the input signals on the basis of the frequency of each of the approximation detection pulse relative to each of the zero-cross detection pulse. With such structure, a single signal detection device can deal with a plurality of input signals inputted at the same time.

In the above-described second aspect, an absolute value of a difference may be obtained by subtracting the second phase value from the first phase value to obtain a first center phase value by adding the first phase value, the second phase value and a phase value corresponding to one period of the phase counter and multiplying it by ½ when the absolute value of the difference is not less than a phase value corresponding to ½ period of the phase counter, and to obtain a first center phase value by adding the first phase value and the second phase value and multiplying it by ½ when the absolute value of the difference is smaller than a phase value corresponding to ½ period of the phase counter.

With such configuration, the mismatching caused in the arithmetic and logic operation can be removed and a correct first center phase value can always be obtained.

According to a signal detection device in a third aspect of the present invention, a zero-cross detection pulse, a time window signal and a time window detection pulse are generated for an input signal. A phase value outputted from a phase counter is stored as a first phase value and a first phase value of the last time is stored as a second phase value. A first center phase value is generated from the first and second phase values and a first center phase value of the last time is stored as a second center phase value. When these first and second center phase values are approximate, an approximation detection pulse is outputted. Then, on the basis of frequency of the approximation detection pulse relative to that of the zero-cross detection pulse, it is determined whether a data signal is included in the input signal. The number of outputs of the approximation detection pulse decreases due to the characteristic that the zero-cross intervals become random when no data signal is received, and it increases because the zero-cross intervals become an integer multiple of one period of the phase counter when the data signal is received. Accordingly, it can be correctly determined whether the data signal is detected or not from the frequency of the approximation detection pulse relative to that of the zero-cross detection pulse.

In the third aspect described above, the zero-cross detection pulse, the time window signal and the time window detection pulse may be generated for each of a plurality of input signals to determine whether a data signal is included in each of the input signals on the basis of the frequency of each of the approximation detection pulse relative to that of each of the zero-cross detection pulse. With such structure, a single signal detection device can deal with a plurality of input signals inputted at the same time.

In the third aspect described above, an absolute value of a difference may be obtained by subtracting the second phase value from the first phase value to obtain a first center phase value by adding the first phase value, the second phase value and a phase value corresponding to one period of the phase counter and multiplying it by ½ when the absolute value of the difference is not less than a phase value corresponding to ½ period of the phase counter, and to obtain a first center phase value by adding the first phase value and the second phase value and multiplying it by ½ when the absolute value of the difference is smaller than a phase value corresponding to ½ period of the phase counter. With such configuration, the mismatching caused in the arithmetic and logic operation can be removed and a correct first center phase value can always be obtained.

According to a clock recovery device in a fourth aspect of the present invention, a zero-cross detection pulse, a time window signal and a time window detection pulse are generated for an input signal. Further, a data receive detection signal indicative whether a data signal is included in the input signal is generated on the basis of a result of calculation of frequency of the time window detection pulse with respect to the zero-cross detection pulse. Also, a phase value outputted from a phase counter is accumulated in response to the time window detection pulse and a mean phase value thereof is calculated. The mean phase value is set in the phase counter as an initial phase when the data receive detection signal changes from a no data signal detection state to a detection state, and a steady phase value is set in the portion of the no-detection state, respectively. Clock is generated on the basis of the phase value outputted from the phase counter. According to such structure, as the initial synchronization is established by using the mean phase value when the data signal is detected, synchronization at high speed is enabled and there is no need of providing long preamble pattern in the head of a data packet as has been conventionally provided. Further, as the zero-cross detection pulse is gated with the time window signal, phase information with low reliability can be removed and phase information with high reliability only can be selected to compute the mean phase value. Accordingly, the initial synchronization at high speed established in signal detection can be correctly made using the mean phase value with high reliability.

In the above-described fourth aspect, in the portion of the data signal detection state of the data receive detection signal, a correction phase value may be set in the phase counter as the initial phase. The correction phase value is generated on the basis of a leading phase, a lagging phase and the same phase determined by accumulating the phase value outputted from the phase counter. According to such configuration, highly stable synchronization can be held after signal detection.

In the above-described fourth aspect, an absolute value of a difference may be obtained by subtracting the phase value of the phase counter from the current mean phase value to obtain a new mean phase value by adding the current mean phase value, the phase value of the phase counter and a phase value corresponding to one period of the phase counter and multiplying it by ½ when the absolute value of the difference is not less than a phase value corresponding to ½ period of the phase counter, and to obtain a new mean phase value by adding the current mean phase value and the phase value of the phase counter and multiplying it by ½ when the absolute value of the difference is smaller than a phase value corresponding to ½ period of the phase counter. With such configuration, the mismatching caused in the arithmetic and logic operation can be removed and a correct mean phase value can be obtained.

According to a clock recovery device in a fifth aspect of the present invention, a zero-cross detection pulse is generated for an input signal. In response to the zero-cross detection pulse, a phase value outputted from a phase counter is stored as a first phase value and a first phase value of the last time is stored as a second phase value. A first center phase value is generated from the first and second phase values and a first center phase value of the last time is stored as a second center phase value in response to the zero-cross detection pulse. Further, it is determined whether the first and second center phase values are approximate or not, and an approximation detection pulse is outputted when they are approximate. Then, on the basis of detection frequency of the approximation detection pulse relative to that of the zero-cross detection pulse, a data receive detection signal indicative whether a data signal is included in the input signal is generated. In response to the approximation detection pulse, the first center phase value is accumulated and a mean phase value thereof is calculated. When the data receive detection signal changes from a no data signal detection state to a detection state, the mean phase value is set in the phase counter as an initial phase, and a steady phase value is set in a portion of the no detection state, respectively. Clock is generated on the basis of the phase value outputted from the phase counter. According to such configuration, as the zero-cross detection pulse is gated with the time window signal and the center phase computing means computes a center phase of the first and second phase values, phase information with low reliability is removed and phase information with high reliability is selected to compute the mean phase value. Accordingly, the initial synchronization at high speed established in detection of signal can be correctly made using the mean phase value with high reliability.

In the fifth aspect above, in the portion of the data signal detection state of the data receive detection signal, a correction phase value may be set in the phase counter as the initial phase. The correction phase value is generated on the basis of the leading phase, the lagging phase and the same phase determined by accumulating the phase values outputted from the phase counter in response to the approximation detection pulse. According to such configuration, highly stable synchronization can be held after signal detection.

In the fifth aspect described above, an absolute value of a difference may be obtained by subtracting the second phase value from the first phase value to obtain a first center phase value by adding the first phase value, the second phase value and a phase value corresponding to one period of the phase counter and multiplying it by ½ when the absolute value of the difference is not less than a phase value corresponding to ½ period of the phase counter, and to obtain a first center phase value by adding the first phase value and the second phase value and multiplying it by ½ when the absolute value of the difference is smaller than a phase value corresponding to ½ period of the phase counter. With such configuration, the mismatching caused in the arithmetic and logic operation can be removed and a correct first center phase value can be obtained.

In the above-described fifth aspect, an absolute value of a difference may be obtained by subtracting the first center phase value from the current mean phase value to obtain a new mean phase value by adding the current mean phase value, the first center phase value and a phase value corresponding to one period of the phase counter and multiplying it by ½ when the absolute value of the difference is not less than a phase value corresponding to ½ period of the phase counter, and to obtain a new mean phase value by adding the current mean phase value and the first center phase value and multiplying it by ½ when the absolute value of the difference is smaller than a phase value corresponding to ½ period of the phase counter. With such configuration, the mismatching caused in the arithmetic and logic operation can be removed and a correct mean phase value can be obtained.

In a clock recovery device in a sixth aspect of the present invention, a zero-cross detection pulse, a time window signal and a time window detection pulse are generated for an input signal. In response to the time window detection pulse, a phase value outputted from a phase counter is stored as a first phase value and a first phase value of the last time is stored as a second phase value. A first center phase value is generated from the first and second phase values and a first center phase value of the last time is stored as a second center phase value in response to the time window signal. When these first and second center phase values are approximate, an approximation detection pulse is outputted and a data receive detection signal indicative whether a data signal is included in the input signal is outputted on the basis of frequency of the approximation detection pulse relative to that of the zero-cross detection pulse. Further, in response to the approximation detection pulse, the first center phase value is accumulated and a mean phase value thereof is calculated. The mean phase value is set in the phase counter as an initial phase when the data receive detection signal changes from a no data signal detection state to a detection state, and a steady phase value is set in the portion of the no-detection state, respectively. Clock is generated on the basis of the phase value outputted from the phase counter.

According to such configuration, as the zero-cross detection pulse is gated with the time window signal and the center phase computing means computes a center phase of the first and second phase values, phase information with low reliability is removed and only phase information with high reliability is selected to calculate the mean phase value. Accordingly, the initial synchronization at high speed established when detecting signal can be correctly made using the mean phase value with high reliability.

In the sixth aspect above, in the portion of the data signal detection state of the data receive detection signal, a correction phase value may be set in the phase counter as the initial phase. The correction phase value is obtained on the basis of the leading phase, the lagging phase and the same phase determined from the output phase values of the phase counter accumulated in response to the approximation detection pulse. According to such configuration, highly stable synchronization can be held after signal detection.

In the sixth aspect described above, an absolute value of a difference may be obtained by subtracting the second phase value from the first phase value to obtain a first center phase value by adding the first phase value, the second phase value and a phase value corresponding to one period of the phase counter and multiplying it by ½ when the absolute value of the difference is not less than a phase value corresponding to ½ period of the phase counter, and to obtain a first center phase value by adding the first phase value and the second phase value and multiplying it by ½ when the absolute value of the difference is smaller than a phase value corresponding to ½ period of the phase counter. With such configuration, the mismatching caused in the arithmetic and logic operation can be removed and a correct first center phase value can always be obtained.

In the above-described sixth aspect, an absolute value of a difference may be obtained by subtracting the first phase value from the current mean phase value to obtain a new mean phase value by adding the current mean phase value, the first center phase value and a phase value corresponding to one period of the phase counter and multiplying it by ½ when the absolute value of the difference is not less than a phase value corresponding to ½ period of the phase counter, and to obtain a new mean phase value by adding the current mean phase value and the first center phase value and multiplying it by ½ when the absolute value of the difference is smaller than a phase value corresponding to ½ period of the phase counter. With such configuration, the mismatching caused in the arithmetic and logic operation can be removed and a correct mean phase value can be obtained.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a timing chart of an input signal and various signals generated on the basis of it in the first embodiment of the present invention.

FIG. 3(a) and 3(b) are schematic diagrams for illustrating the computing operation of a center phase value in the first embodiment of the present invention.

DESCRIPTION OF THE PREFERRED EMBODIMENTS (1) First Embodiment

Figure 1:
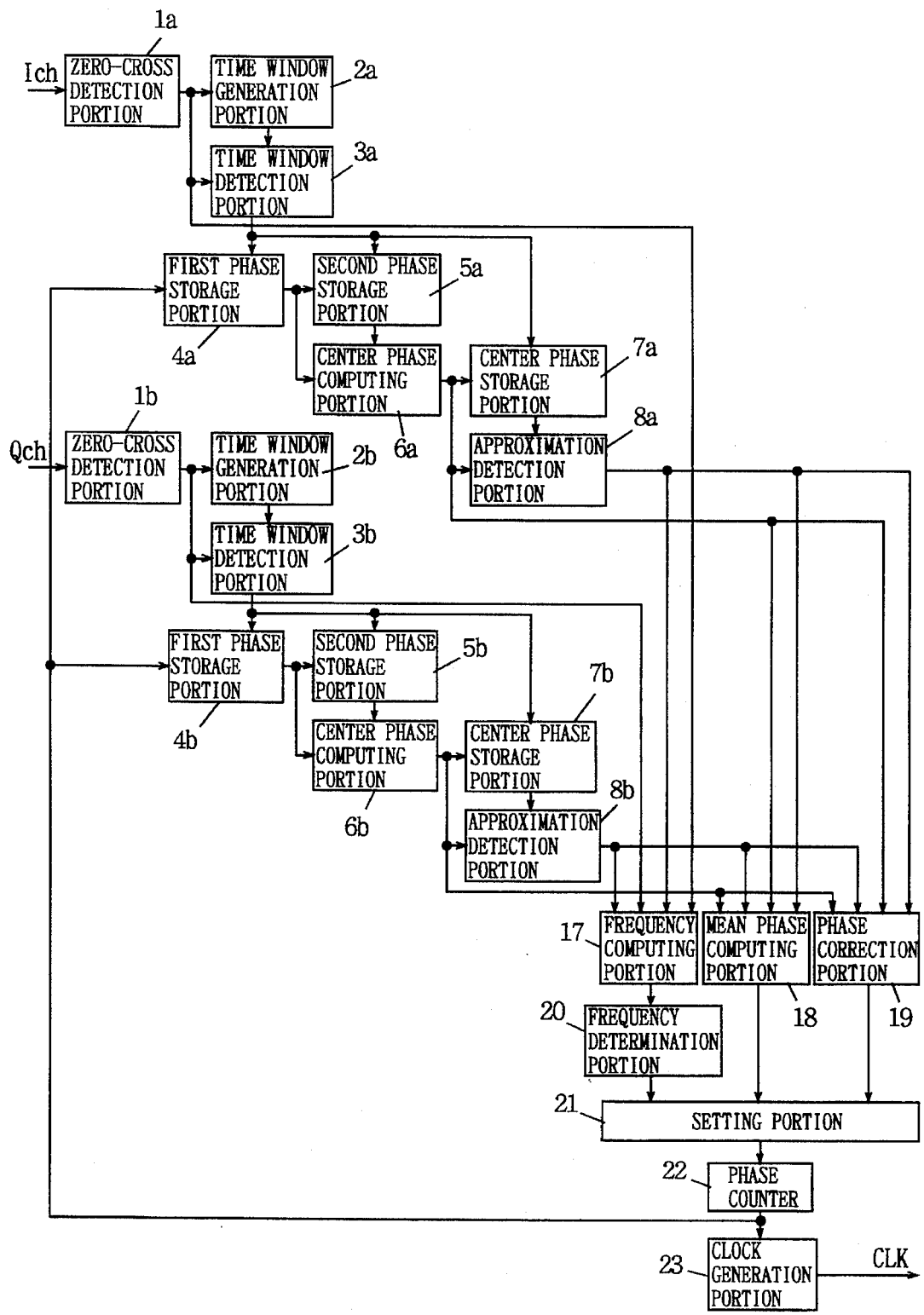
FIG. 1 is a block diagram showing the structure of a clock recovery device including a signal detection device according to the first embodiment of the present invention.

FIG. 1 is a block diagram showing the structure of a clock recovery device including a signal detection device according to the first embodiment of the present invention. In FIG. 1, the clock recovery device includes zero-cross detection portions 1a and 1b, time window generation portions 2a and 2b, time window detection portions 3a and 3b, first phase storage portions 4a and 4b, second phase storage portions 5a and 5b, center phase computing portions 6a and 6b, center phase storage portions 7a and 7b, approximation detection portions 8a and 8b, a frequency computing portion 17, a mean phase computing portion 18, a phase correction portion 19, a frequency determination portion 20, a setting portion 21, a phase counter 22 and a clock generating portion 23. Now, the zero-cross detection portions 1a and 1b, the time window generation portions 2a and 2b, the time window detection portions 3a and 3b, the first phase storage portions 4a and 4b, the second phase storage portions 5a and 5b, the center phase computing portions 6a and 6b, the center phase storage portions 7a and 7b, and the approximation detection portions 8a and 8b are provided to process I axis input signal (I-signal) and Q axis input signal (Q-signal), respectively.

The zero-cross detection portions 1a and 1b output zero-cross detection pulse from input signals of the I-signal and the Q-signal, respectively. The time window generation portions 2a and 2b generate and output time window signals on the basis of the zero-cross detection pulse for time reference. The time window detection portions 3a and 3b generate and output time window detection pulse from the zero-cross detection pulses and the time window signals. The phase counter 22 performs counting operation at an integer multiple of a symbol rate of the input signal. The first phase storage portions 4a and 4b store phase values of the phase counter 22 as first phase values in response to the time window detection pulse. The second phase storage portions 5a and 5b store the first phase values of their last time as second phase values in response to the time window detection pulse. The center phase computing portions 6a and 6b compute and output first center phase values from the first phase values and the second phase values. The center phase Storage portions 7a and 7b store the first center phase values of the last time as second center phase values in response to the time window detection pulses. The approximation detection portions 8a and 8b generate and output approximation detection pulses from the first and second center phase values. The frequency computing portion 17 computes frequency of the approximation detection pulse with respect to a given number of zero-cross detection pulse. The frequency determination portion 20 outputs a data receive detection signal on the basis of the frequency of detection. The mean phase computing portion 18 accumulates the first center phase values in response to the approximation detection pulse to compute and output a mean phase value. The phase correction portion 19 accumulates the first center phase value in response to the approximation detection pulse to determine a leading phase, a lagging phase, or the same phase, and outputs a corresponding correction phase value. The setting portion 21 sets one of the mean phase value, a steady phase value and the correction phase value as an initial phase in the phase counter 22 according to the data receive detection signal. The clock generating portion 23 generates clock (CLK) from decoding the output of the phase counter 22.

The above-described phase counter 22 counts self-contained clocks (having a frequency which is 16 times a symbol rate of the input signal) generated in an internal oscillator not shown, and the count value is used as a phase value for detecting a phase of the input signal or producing the clock. Generally, in the phase counter 22, a carry occurs every time 16 self-contained clocks are counted and the count value returns to the initial value 0. Accordingly, 16 kinds (0–15) of phase values are obtained from the phase counter 22. However, as this phase counter 22 is comprised of a 4-bit hexadecimal programmable counter which is capable of setting of the initial phase, when an initial phase is set by the setting portion 21, it starts counting the self-contained clock from this initial phase. Accordingly, in this case, a time taken from the start of counting to the carry becomes shorter in accordance with the set value of the initial phase.

Next, the operation of the clock recovery device shown in FIG. 1 will be described. It is assumed that the input signal to the clock recovery device of this embodiment is a signal which is obtained by applying the reverse packet transmission process to the received electronic wave in a preprocessing step and then applying the QPSK demodulation thereto, where there are two detected signals, the I-signal and the Q-signal. Also, assuming that one period is divided into 16, the operation of the clock recovery device of this embodiment will be described.

First, the zero-cross detection portion 1a extracts zero-cross timing (i.e., leading edges and trailing edges) of the I-signal to generate and output such a zero-cross detection pulse as shown in FIG. 2. Next, the time window generating portion 2a demultiplies the self-contained clock described above and adjusts its pulse width and phase on the basis of the above-described zero-cross detection pulse for time reference to generate and output such a time window signal as shown in FIG. 2, which has its starting point at the first zero-cross detection pulse and has a certain width centered about a position of each period corresponding to the symbol rate of the input signal. The time window detection portion 3a operates AND of the zero-cross detection pulse and the time window signal to generate and output such a time window detection pulse as shown in FIG. 2. With such operation, it can be known on the basis of the time window detection pulse whether the zero-cross detection pulse is generated at timing in synchronization with the self-contained clock. The first phase storage portion 4a stores the phase value of the phase counter 22 as a first phase value, triggered by this time window detection pulse. Similarly, the second phase storage portion 5a also uses the time window detection pulse as trigger to store the first phase value of the last time as a second phase value. Accordingly, two phase values for different times are obtained.

Next, the center phase computing portion 6a operates a first center phase value from the first and second phase values in order to smooth the difference in phase of the zero-cross detection pulse relative to the above described self-contained clock. That is to say, the center phase computing portion 6a obtains an absolute value of a difference between the first and second phase values stored in the first and second phase storage portions 4a and 5a to determine whether the absolute value is not less than ½ period (which is 8 here because one period is assumed to be 16), or below ½ period, and operates the first center phase with different algorithms according to the result of the determination. For example, when the absolute value (12) of the difference between the first phase value (15) and the second phase value (3) is not less than the ½ period (8) as shown in FIG. 3(a), the center phase computing portion 6a obtains a sum of the two phase values and one period (16). In this example, the sum is (34), but the carry is limited to one digit (bit) and the carry part is actually neglected, and it becomes (2). Then, ½ of this sum (2) is outputted as the first center phase value (1). On the other hand, when the absolute value (4) of the difference between the first phase value (1) and the second phase value (5) is below ½ period (8) as shown in another example of FIG. 3(b), the center phase computing portion 6a outputs ½ of the sum of the two phase values, (6), as the first center phase value (3). With such operation, the mismatching occurring in the arithmetic operation is removed and a correct first center phase value can be obtained.

Next, the center phase storage portion 7a stores the first center phase value of the last time as the second center phase value, triggered by their time window detection pulse from the time window detection portion 3a. Thus two center phase values for different times are obtained. These first and second center phase values are virtual phase values obtained by the smoothing operation, but in this embodiment, an initial mean phase of the input signal is detected on the basis of these virtual phase values. This averages a sharp change in phase at the beginning of input of the data signal and enables correct rough adjustment of the initial phase.

Next, the approximation detection portion 8a determines that the first and second center phase values are approximate to each other when an absolute value of a difference between the first and second center phase values is smaller than a predetermined reference value, or when it is larger than a value obtained by subtracting the reference value from one period, and outputs an approximation detection pulse at a high level, for example. In other cases, the approximation detection portion 8a determines that the first and second center phase values are not approximate and does not output the approximation detection pulse.

The Q-signal is also processed in the same way as the above-described I-signal by the zero-cross detection portion 1b, the time window generating portion 2b, the time window detection portion 3b, the first phase storage portion 4b, the second phase storage portion 5b, the center phase computing portion 6b, the center phase storage portion 7b and the approximation detection portion 8b.

The frequency computing portion 17 computes and outputs for each zero-cross detection pulse the total number of pulses of the approximation detection pulse coming from the approximation detection portions 8a and 8b (referred to as detection frequency, hereinafter) while a zero-cross detection pulse with a certain number of pulses (which can be arbitrarily set, and it is selected to 15 pulses in this embodiment) is provided from the zero-cross detection portions 1a and 1b. In a state of receiving no data signal, the randomness of the input signal is large and therefore the detection frequency of the approximation detection pulse becomes small. On the other hand, in a state of receiving the data signal, the randomness of the input signal is small and the detection frequency of the approximation detection pulse becomes large.

The frequency determination portion 20 determines that the data signal is detected when the detection frequency computed in the frequency computing portion 17 becomes larger than a receive detection reference value (which is selected to 7 in this embodiment) and outputs a data receive detection signal at a high level. When the detection frequency becomes smaller than a no-receive detection reference value (which is selected to 2 in this embodiment), it determines that no data signal is detected and outputs a data receive detection signal at a low level.

The mean phase computing portion 18 subtracts the first center phase value (which is provided from the center phase computing portions 6a and 6b) from the current mean phase value (which is stored and held in the mean phase computing portion 18 and updated every time) every time the approximation detection pulse is provided from the approximation detection portions 8a and 8b to obtain an absolute value of the difference. When the absolute value of the difference is not less than ½ period, it rewrites the current mean phase value with a new mean phase value which is obtained by adding the current mean phase value, the first center phase value and one period (16) and multiplying it by ½, and when the absolute value of the difference is below ½ period, it rewrites the current mean value with a new mean phase value obtained by adding the current mean phase value and the first center phase value and multiplying it by ½.

Figure 5:
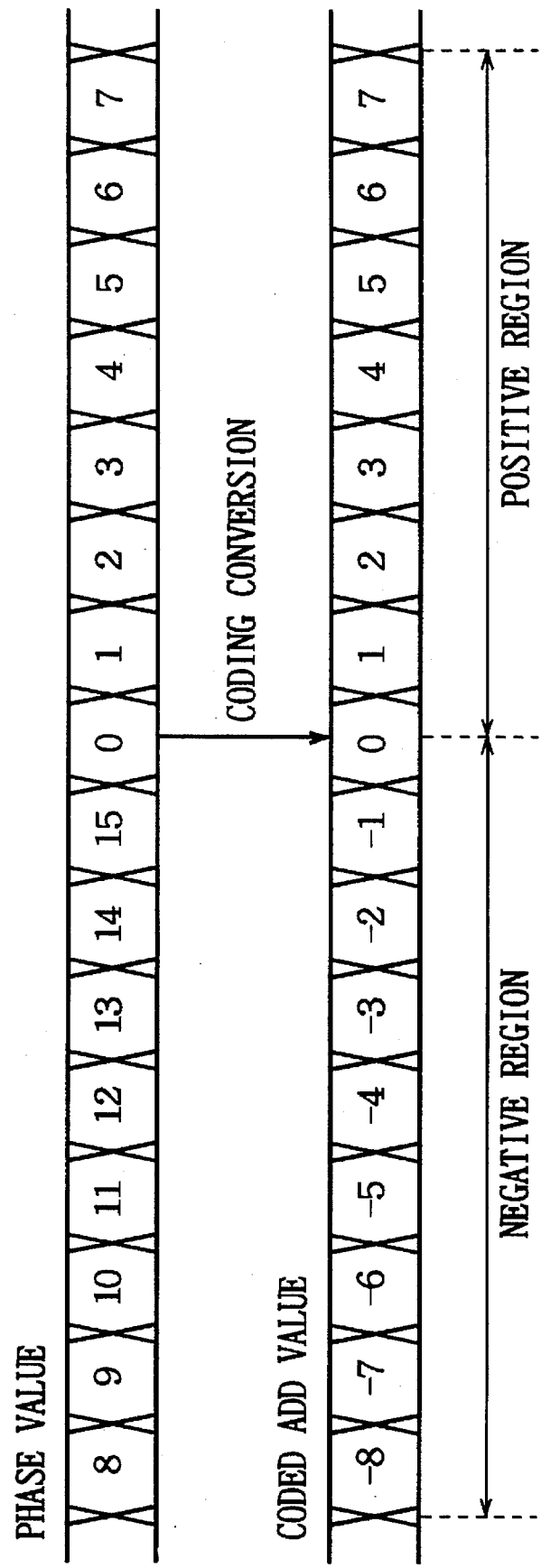
FIG. 5 is a schematic diagram showing the relation of correspondence between an output phase value of a phase counter and the coded add value in the first embodiment of the present invention.

The phase correction portion 19 converts the first center phase value provided from the center phase computing portions 6a and 6b as shown in FIG. 14 to generate a coded add value. At this time, by making a plurality of copies of the high-order position (the most significant bit, MSB) of the phase value for equality to the number of digits (bits) of the accumulated value, the phase value indicating 0–15 can be converted into coded (i.e., the negative region is represented by twos complement) add value of −8–7 as illustrated in FIG. 5. For example, in the case of a phase-value of "1100"=12 which corresponds to the negative region, the coded add value is "11111100", where the LSB 4 bits of this coded add value, "1100", is "1100"=−4 which is a twos complement of "0100"=4. If the phase value is "0011"=3 which corresponds to the positive region, the coded add value is "00000011", where the LSB 4 bits "0011" of this coded add value represents 3 as it is. Also, the phase correction portion 19 adds the coded add value with the current accumulation value (which is stored and held in the phase correction portion 19 and updated every time) every time the approximation detection pulse is provided from the approximation detection portions 8a and 8b to operate a new accumulation value. Then, when the operated new accumulation value reaches a predetermined positive or negative reference value the phase correction portion 19 determines the leading phase or the lagging phase, and determines the same phase in other cases, and outputs a correction phase value correspondingly.

Figure 6:
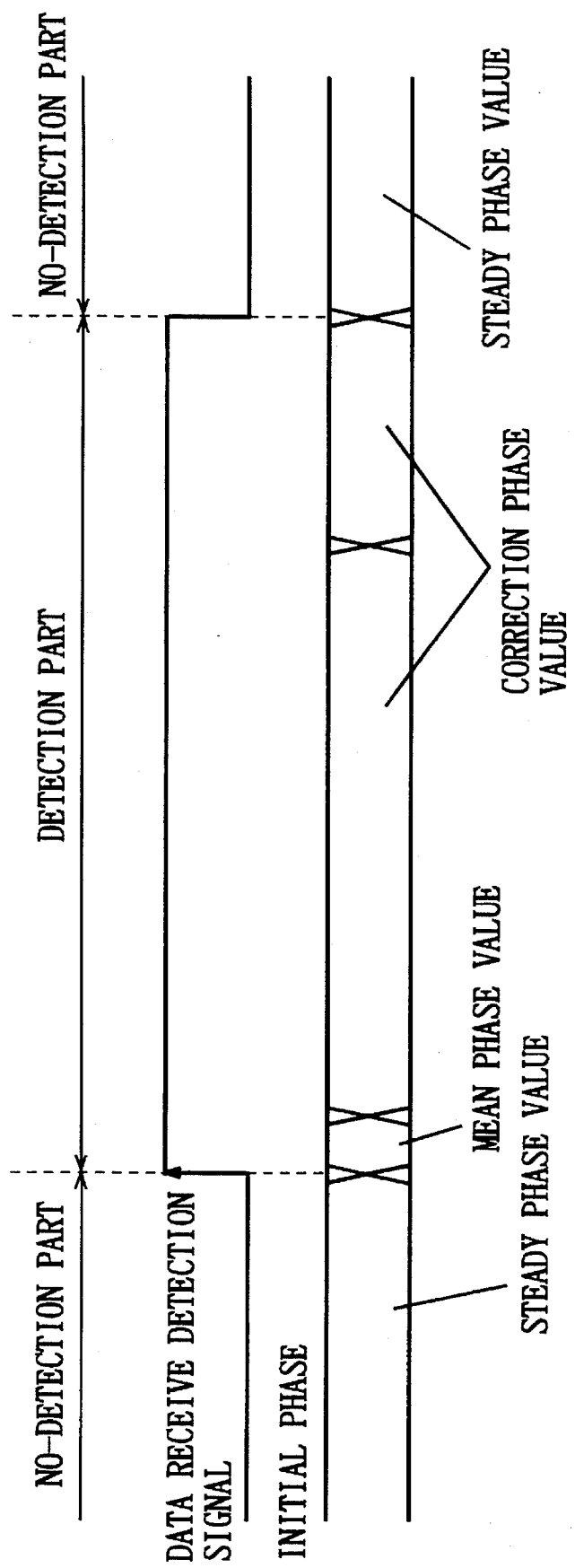
FIG. 6 is a timing chart showing a manner of setting an initial phase in the phase counter in the first embodiment of the present invention.
Figure 7:
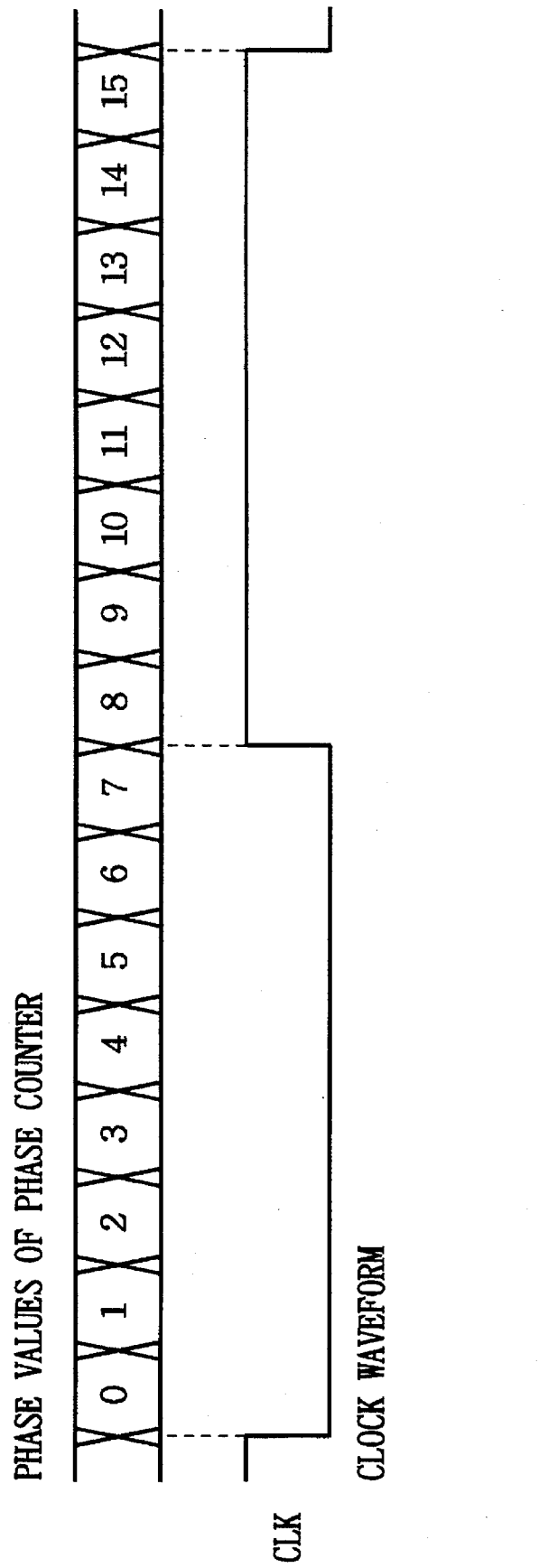
FIG. 7 is a schematic diagram showing the relation of correspondence between the output phase value of the phase counter and the clock waveform in the first embodiment of the present invention.

The setting portion 21 sets a steady phase value 0 in the phase counter 22 as an initial phase when the data receive detection signal from the frequency determination portion 20 indicates a no-detection state of the data signal, as shown in FIG. 6. When the data receive detection signal changes from the no-detection state to a detection state, it sets the mean phase value calculated by the mean phase computing portion 18 in the phase counter 22 as an initial phase. The rough adjustment of phase of the clock (CLK) is accomplished in this way. Furthermore, when the data receive detection signal indicates the detection state, it sets the correction phase value calculated by the phase correction portion 19 in the phase counter 22 as an initial please. This effects fine adjustment of phase of the clock (CLK). The phase counter 22 performs counting of the above-stated self-contained clock from the initial phase and output phase values corresponding to the counted values. The clock generation portion 23 decodes the phase values of the phase counter 21 to generate clock (CLK) of one period having such relation with that phase value as shown in FIG. 7. That is to say, the output of the clock generating portion 23 is at a low level while the phase value of the phase counter 22 is 0 through 7, and it attains a high level while the phase value is 8 through 15.

As has been described above, in the approximation detection in the approximation detection portions 8a and 8b, the number of detection becomes smaller due to the characteristic that the zero-cross intervals become random when no data signal is received, and the number of detection increases when the data signal is received since the zero-cross intervals become integer multiples of one period of the self-contained clock. Accordingly, a correct determination can be made as to whether the data signal is detected or not from the detection frequency of the approximation detection pulse relative to a certain number of zero-cross detection pulse. Also, in the embodiment described above, by gating the zero-cross detection pulse with the time window signal and computing the center phase in the center phase computing portions 6a and 6b, phase information with low reliability is removed and phase information with high reliability only is selected to compute the mean phase value and the correction phase value. Therefore, initial synchronization at high speed performed when detecting signal can be exactly established using the mean phase value with high reliability, and highly stable synchronization can be held using the correction phase value with high reliability after the signal detection.

(2) Second Embodiment

Figure 8:
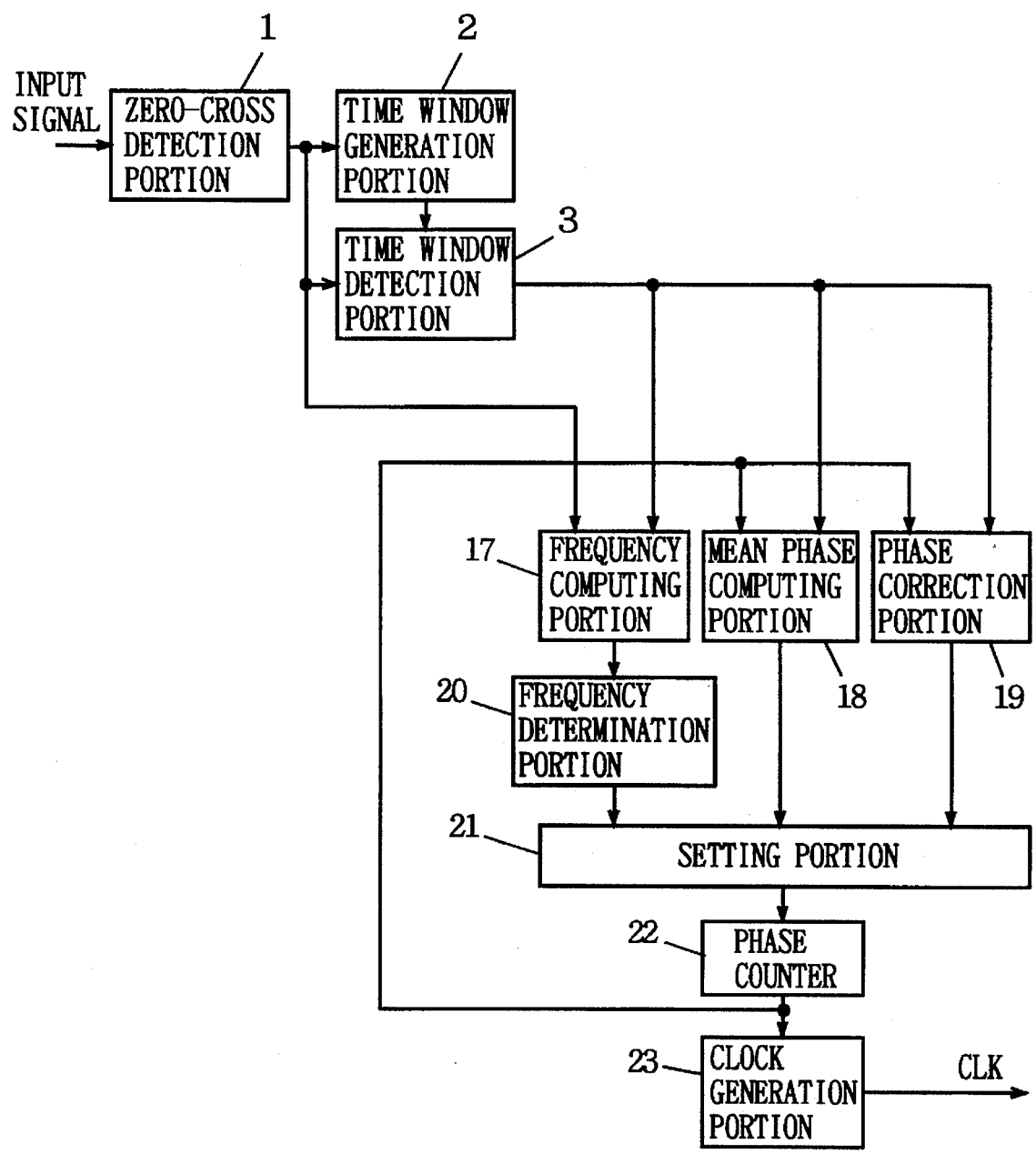
FIG. 8 is a block diagram showing the structure of a clock recovery device including a signal detection device according to the second embodiment of the present invention.

FIG. 8 is a block diagram showing the structure of a clock recovery device including a signal detection device according to the second embodiment of the present invention. The second embodiment is different from the first embodiment described above (refer to FIG. 1) in the points that only one input signal is processed, and that the first and second phase storage portions, the center phase computing portion, the center phase storage portion and the a proximation detection portion are not provided. In FIG. 8, the clock recovery device of this embodiment includes a zero-cross detection portion 1 for outputting a zero-cross detection pulse from the input signal, a time window generation portion 2 for generating and outputting a time window signal on the basis of the zero-cross detection pulse for time reference, a time window detection portion 3 for generating and outputting a time window detection pulse from the zero-cross detection pulse and the time window signal, a phase counter 22 capable of setting of initial phase for performing counting operation at an integer multiple of a symbol rate of the input signal, a frequency computing portion 17 for computing detection frequency of the time window detection pulse with respect to a certain number of zero-cross detection pulses, a frequency determination portion 20 for determining presence/absence of data signal on the basis of the detection frequency computed in the frequency computing portion 17 and outputting a data receive detection signal, a mean phase computing portion 18 for accumulating phase values of the phase counter 22 in response to the time window detection pulse and computing a mean phase value, a phase correction portion 19 for accumulating the phase value of the phase counter 22 in response to the time window detection pulse to determine the leading phase, the lagging phase, the same phase and outputting a corresponding correction phase value, a setting portion 21 for setting one of a mean phase value, a steady phase value and a correction phase value as the initial phase in the phase counter 22 in accordance with the data receive detection signal and a clock generating portion 23 for generating clock (CLK) on the basis of the phase value outputted from the phase counter 22.

Next, the operation of the clock recovery device shown in FIG. 8 will be described. Assuming that one period is divided into 16, the operation of the clock recovery device of the present embodiment will be described below.

First, the zero-cross detection portion 1 extracts zero-cross timing of the input signal to generate and output such a zero-cross detection pulse as shown in FIG. 2. Next, the time window generating portion 2 demultiplies the self-contained clock generated by an internal oscillator not shown and also adjusts its pulse width and phase on the basis of the above-described zero-cross detection pulse for time reference to generate and output such a time window signal as shown in FIG. 2 which has its starting point at the first zero-cross detection pulse and has a certain width centered about a position for each period corresponding to the symbol rate of the input signal. The time window detection portion 3 operates AND of the zero-cross detection device and the time window signal to generate and output such a time window detection pulse as shown in FIG. 2. With such operation, it can be known on the basis of the time window detection pulse whether the zero-cross detection pulse is generated at timing in synchronization with the self-contained clock.

The frequency computing portion 17 computes and outputs for each zero-cross detection pulse the total number of the time window detection pulses coming from the time window detection portion 3 (referred to as detection frequency, hereinafter) while a zero-cross detection pulse with a certain number of pulses (which can be arbitrarily set, and it is selected to 15 pulses in this embodiment) is provided from the zero-cross detection portion 1. In a state of receiving no data signal, the randomness of the input signal is large and so the detection frequency of the time window detection pulse becomes small. On the other hand, in a state of receiving data signal, the randomness of the input signal is small and the detection frequency of the time window detection pulse becomes large.

The frequency determination portion 20 determines that the data signal is detected when the detection frequency of the time window detection pulse is larger than a receive detection reference value (which is selected to 7 in this embodiment) and outputs a data receive detection signal at a high level, for example. When the detection frequency of the time window detection pulse is smaller than a no-receive detection reference value which is selected to 2 in this embodiment), it determines that no data signal is detected and outputs a data receive detection signal at a low level, for example.

The mean phase computing portion 18 subtracts the output phase value of the phase counter 22 from the current mean phase value for each time window detection pulse from the time window detection portion 3 to obtain an absolute value thereof. When the absolute value is not less than ½ period, it rewrites the current mean phase value with a new mean phase value which is obtained by adding the current mean phase value, the output phase value of the phase counter 22 and one period (16) and multiplying it by ½, and when the absolute value is below ½ period, it rewrites the current mean phase value with a new mean phase value obtained by adding the current mean phase value and the output phase value of the phase counter 22 and multiplying it by ½.

Figure 4:
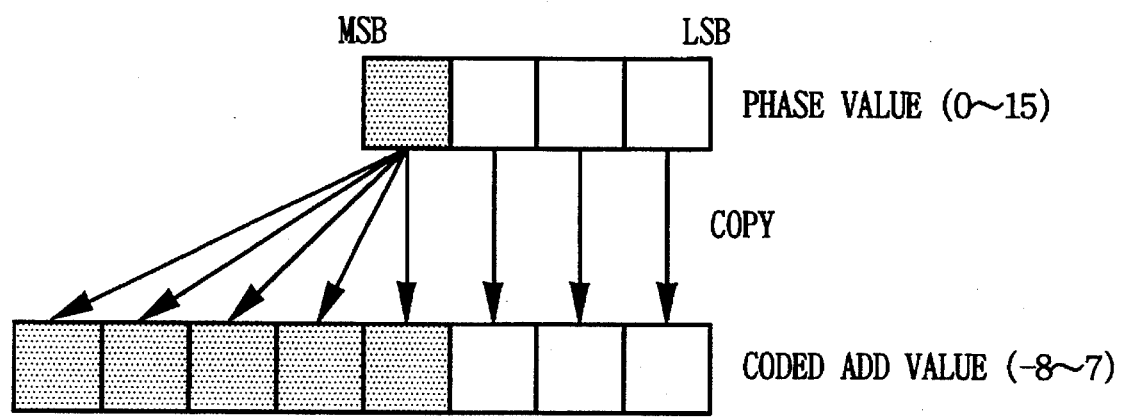
FIG. 4 is a schematic diagram for illustrating the generating method of a coded add value in the first embodiment of the present invention.

The phase correction portion 19 converts the output phase value of the phase counter 22 as shown in FIG. 4 to generate a coded add value. At this time, by making a plurality of copies of the high-order position (the most significant bit, MSB) of the phase value for equality to the number of digits (bits) of the accumulation value, the phase value indicating 0–15 can be converted into coded (i.e., the negative region is represented by twos compliment) add value of −8–7 as illustrated in FIG. 5. This is the Same as the first embodiment. Also, the phase correction portion 19 adds the coded add value with the current accumulation value (which is stored and held in the phase correction portion 19 and updated every time) every time the time window detection pulse is provided from the time window detection portion 3 to operate a new accumulation value. Then, when the operated new accumulation value reaches a predetermined positive or negative reference value, the phase correction portion 19 determines the leading phase or the lagging phase, and determines the same phase in other cases, and outputs a correction phase value correspondingly.

As shown in FIG. 6, the setting portion 21 sets a steady phase value 0 in the phase counter 22 as the initial phase when the data receive detection signal from the frequency determination portion 201 indicates a no-detection state of data signal, and when the data receive detection signal changes from the no-detection state to a detection state, it sets the mean phase value calculated by the mean phase computing portion 18, and when the data receive detection signal indicates the detection state, it sets the correction phase value operated by the phase correction portion 19, respectively. The phase counter performs counting of the above-stated self-contained clock from the initial phase and outputs a phase value corresponding to the counted value. The clock generation portion 23 decodes the phase value of the phase counter 21 to generate clock (CLK) of one period as shown in FIG. 7.

As has been described above, the number of outputs of the time window detection pulse in the time window detection portion 3 becomes smaller due to the characteristic that the zero-cross intervals become random when receiving no data signal, and on the other hand, it increases when receiving data signal since the zero-cross intervals become an integer multiple of one period of the self-contained clock. Accordingly, a correct determination can be made as to whether data signal is detected or not from the detection frequency of the time window detection pulse relative to a certain number of zero-cross detection pulses. Also, in the embodiment described above, by gating the zero-cross detection pulse with the time window signal, phase information with low reliability is removed and phase information with high reliability only is selected to compute the mean phase value and the correction phase value. Therefore, initial synchronization at high speed performed when detecting signal can be exactly established using the mean phase value, and highly stable synchronization can be held using the correction phase value after the signal detection.

Now, although the second embodiment described above is structured to process the one input signal, it may be structured to process plural input signals as in the first embodiment described before. In such a case, plural sets of zero-cross detection portions 1, time window generation portions 2 and time window detection portions 3 will be provided and the frequency computing portion 17 will compute detection frequencies of a plurality of time window detection pulses relative to a plurality of zero-cross detection pulses.

(3) Third Embodiment

Figure 9:
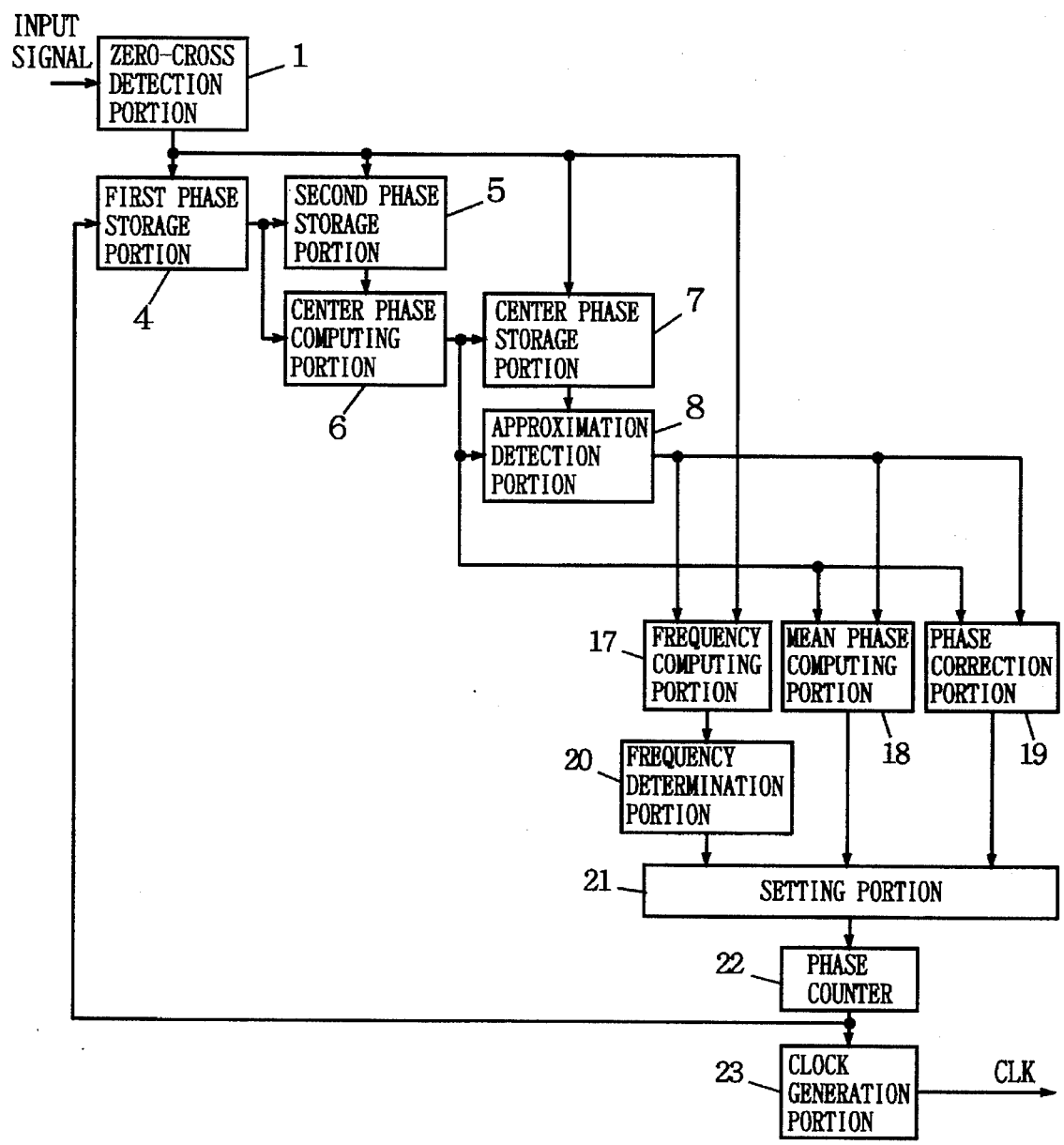
FIG. 9 is a block diagram showing the structure of a clock recovery device including a signal detection device according to the third embodiment of the present invention.

FIG. 9 is a block diagram showing the structure of a clock recovery device including a signal detection device according to the third embodiment of the present invention. The third embodiment is different from the first embodiment described above (refer to FIG. 1) in that the only one input signal system is processed, and that the time window generating portion and the time window detection portion are not provided. In FIG. 9, the clock recovery device of this embodiment includes a zero-cross detection portion 1 for outputting a zero-cross detection pulse from an input signal, a phase counter 22 capable of setting of an initial phase, for performing counting operation at an integer multiple of a symbol rate of the input signal, a first phase storage portion 4 for storing an output phase value of the phase counter as a first phase value in response to the zero-cross detection pulse, a second phase storage portion 5 for storing the first phase value of the last time as a second phase value in response to the zero-cross detection pulse, a center phase computing portion 6 for computing a first center phase value in which a phase change is smoothed from the first and second phase values, a center phase storage portion 7 for storing the first center phase value of the last time as a second center phase value in response to the zero-cross detection pulse, an approximation detection portion 8 for determining whether the first and second center approximation values approximate or not to output an approximation detection pulse, a frequency computing portion 17 for computing detection frequency of the approximation detection pulse relative to a certain number of zero-cross detection pulses, a frequency determination portion 20 for outputting a data receive detection signal on the basis of the detection frequency of the approximation detection pulse, a mean phase computing portion 18 for accumulating the first center phase value in response to the approximation detection pulse to compute a mean phase value, a phase correction portion 19 for accumulating the first center phase value in response to the approximation detection pulse to determine the leading phase, the lagging phase, the same phase from the accumulation value and outputting a corresponding correction phase value, a setting portion 21 for selecting one of a mean phase value, a steady phase value and a correction phase value in accordance with the data receive detection signal and setting it as an initial phase in the phase counter 22 and a clock generating portion 23 for generating clock (CLK) on the basis of the output phase of the phase counter 22.

Next, the operation of the clock recovery device shown in FIG. 9 will be described. Assuming that one period is divided into 16, the operation of the clock recovery device of the present embodiment will be described below.

First, the zero-cross detection portion 1 extracts zero-cross timing of the input signal to generate and output such a zero-cross detection pulse as shown in FIG. 2. With this zero-cross detection pulse as trigger, the first phase storage portion 4 stores an output phase value of the phase counter 22 as the first phase value. In the same way, the second phase storage portion 5 stores the first phase value of the last time as a second phase value triggered by the zero-cross detection pulse. Two phase values are thus obtained for different times.

Next, the center phase computing portion 6 operates a first center phase value from the first and second phase values in order to smooth the difference in phase of the zero-cross detection pulse with respect to the self-contained clock generated by an internal oscillator not shown. That is to say, the center phase computing portion 6 obtains an absolute value of a difference between the first and second phase values stored in the first and second phase storage portions 4 and 5 to determine whether the absolute value is not less than ½ period (which is 8 here because one period is assumed to be 16), or below ½ period, and operates the first center phase with different algorithms according to the result of the determination. Since these algorithms are the same as those executed in the center phase computing portion 6a of the first embodiment described referring to FIG. 3, detailed description thereof is not repeated.

Next, the center phase storage portion 7 stores the first center phase value of the last time as the second center phase value with trigger of the time window detection pulse from the time window detection portion 3. Thus, two center phase values for different times are obtained. These first and second center phase values are virtual phase values obtained by the smoothing operation, but in this embodiment, an initial mean phase of the input signal is detected on the basis of these virtual phase values. This averages a sharp change in phase at an initial stage of inputting data signal and enables exact rough adjustment of the initial phase.

Next, the approximation detection portion 8 determines that the first and second center phase values are approximate to each other when the absolute value of the difference between the first and second center phase values is smaller than a predetermined reference value, or when it is larger than a value obtained by subtracting the reference value from one period, and outputs an approximation detection pulse at a high level, for example. In other cases, the approximation detection portion 8 determines that the first and second center phase values are not approximate and does not output the approximation detection pulse.

The operations of the frequency computing portion 17, the mean phase computing portion 18, the phase correction portion 19, the frequency determination portion 20, the setting portion 21, the phase counter 22 and the clock generating portion 23 in this embodiment are the same as the operations of those in the first embodiment described above, therefore a description thereof is not repeated here.

As has bee described above, in the approximation detection in the approximation detection portion 8, the number of detection becomes smaller due to the characteristic that the zero-cross intervals become random when not receiving the data signal, and to the contrary, the number of detection increases when receiving the data signal since the zero-cross intervals become an integer multiple of one period of the self-contained clock. Accordingly, a correct determination can be made as to whether the data signal is detected or not from the detection frequency of the approximation detection pulse relative to a certain number of zero-cress detection pulses. Also, in the embodiment described above, by computing the center phase in the center phase computing portions 6a and 6b, phase information with low reliability is removed and phase information with high reliability only is selected to compute the mean phase value and the correction phase value. Therefore, initial synchronization at high speed performed when detecting signal can be exactly established using the mean phase value, and highly stable synchronization can be held using the correction phase value after the signal detection.

Now, although the third embodiment described above is configured to process the one input signal, it may be configured to process plural input signals as in the first embodiment described before. In such a case, plural sets of zero-cross detection portions 1, first and second phase storage portions 4 and 5, center phase computing portions 6, the center phase storage portions 7 and approximation detection portions 8 will be provided and the frequency computing portion 17 will compute detection frequencies of a plurality of approximation detection pulses relative to a plurality of zero-cross detection pulses.

While the invention has been described in detail, the foregoing description is in all aspects illustrative and not restrictive. It is understood that numerous other modifications and variations can be devised without departing from the scope of the invention.

What is claimed is:

1. A signal detection device for detecting whether a data signal is included in an input signal or not, comprising:

zero-cross detection means for extracting a zero-cross timing of said input signal to generate and output a zero-cross detection pulse;

time window generating means for generating and outputting a time window signal defining a time window with a certain period on the basis of said zero-cross detection pulse for time reference;

time window detection means for extracting said zero-cross detection pulse which passes the time window defined by said time window signal and outputting it as a time window detection pulse;

frequency computing means for computing detection frequency of said time window detection pulse relative to said zero-cross detection pulse; and frequency determination means for determining whether a data signal is included in said input signal or not on the basis of the detection frequency of said time window detection pulse.

2. The signal detection device according to claim 1, wherein a plurality of sets of said zero-cross detection means, said time window generating means and said time window detection means are provided corresponding to a plurality of said input signals, said frequency computing means computes detection frequency of a plurality of said time window detection pulses with respect to a plurality of said zero-cross detection pulses, and said frequency determining means determines whether a data signal is included in each said input signal on the basis of the detection frequency of each said time window detection pulse.

3. A signal detection device for detecting whether a data signal is included in an input signal or not, comprising:

zero-cross detection means for extracting a zero-cross timing of said input signal to generate and output a zero-cross detection pulse;

a phase counter for performing counting operation at an integer multiple of a symbol rate of said input signal to cyclically output a phase value with a certain period;

first phase storage means for storing the phase value outputted from said phase counter as a first phase value in response to said zero-cross detection pulse;

second phase storage means for storing said first phase value of the last time as a second phase value in response to said zero-cross detection pulse;

center phase computing means for computing the center of phase from said first and second phase values to generate a first center phase value;

center phase storage means for storing said first center phase value of the last time as a second center phase value in response to said zero-cross detection pulse;

approximation detecting means for determining whether said first center phase value end said second center phase value are approximate or not and outputting an approximation signal if they are approximate;

frequency computing means for computing detection frequency of said approximation detection pulse with respect to said zero-cross detection pulse; and frequency determination means for determining whether a data signal is included in said input signal or not on the basis of the detection frequency of said approximation detection pulse.

4. The signal detection device according to claim 3, wherein plural sets of said zero-cross detection means, said first phase storage means, said second phase storage means, said center phase computing means, said center phase storage means and said approximation detection means are provided corresponding to a plurality of said input signals, said frequency computing means computes detection frequency of a plurality of said approximation detection pulses with respect to a plurality of said zero-cross detection pulses, and said frequency determination means determines whether a data signal is included in each said input signal or not on the basis of the detection frequency of each said approximation detection pulse.

5. The signal detection device according to claim 3, wherein said center phase computing means subtracts said second phase value from said first phase value to obtain an absolute value of the difference, and adds said first phase value, said second phase value and a phase value corresponding to one period of said phase counter and multiplies it by ½ to obtain said first center phase value when the absolute value of the difference is not less than a phase value corresponding to ½ period of said phase counter, and adds said first phase value and said second phase value and multiplies it by ½ to obtain said first center phase value when the absolute value of the difference is smaller than a phase value corresponding to ½ period of said phase counter.

6. A signal detection device for detecting whether a data signal is included in an input signal or not, comprising:

zero-cross detection means for extracting a zero-cross timing of said input signal to generate and output a zero-cross detection pulse;

time window generating means for generating and outputting a time window signal defining a time window with a certain period on the basis of said zero-cross detection pulse for time reference;

time window detection means for extracting said zero-cross detection pulse passing the time window defined by said time window signal and outputting it as a time window detection pulse;

a phase counter for performing counting operation at an integer multiple of a symbol rate of said input signal to cyclically output a phase value with a certain period;

first phase storage means for storing the phase value outputted from said phase counter as a first phase value in response to said time window detection pulse;

second phase storage means for storing said first phase value of the last time as a second phase value in response to said time window detection pulse;

center phase computing means for computing the center of phase from said first and second phase values to generate a first center phase value;

center phase storage means for storing said first center phase value of the last time as a second center phase value in response to said time window detection pulse;

approximation detecting means for determining whether said first center phase value and said second center phase value are approximate or not to output an approximation detection pulse if they are approximate;

frequency computing means for computing detection frequency of said approximation detection pulse relative to said zero-cross detection pulse; and frequency determination means for determining whether a data signal is included in said input signal or not on the basis of the detection frequency oil said approximation detection pulse.

7. The signal detection device according to claim 6, wherein plural sets of said zero-cross detection means, said time window generating means, said time window detection means, said first phase storage means, said second phase storage means, said center phase computing means, said center phase storage means and said approximation detection means are provided corresponding to a plurality or said input signals, said frequency computing means computes detection frequency of a plurality of said approximation detection pulses with respect to a plurality of said zero-cross detection pulses, and said frequency determination means determines whether a data signal is included in each said input signal or not on the basis of the detection frequency of each said approximation detection pulse.

8. The signal detection device according to claim 6, wherein said center phase computing means subtracts said second phase value from said first phase value to obtain an absolute value of the difference, and adds said first phase value, said second phase value and a phase value corresponding to one period of said phase counter and multiplies it by ½ to obtain said first center phase value when the absolute value of the difference is not less than a phase value corresponding to ½ period of said phase counter, and adds said first phase value and said second phase value and multiplies it by ½ to obtain said first center phase value when the absolute value of the difference is smaller than a phase value corresponding to ½ period of said phase counter.

9. A clock recovery device for recovering from a data signal included in an input signal a clock synchronized with the data signal, comprising:

zero-cross detection means for extracting a zero-cross timing of said input signal to generate and output a zero-cross detection pulse;

time window generating means for generating and outputting a time window signal defining a time window with a certain period on the basis of said zero cross detection pulse for time reference;

time window detection means for extracting said zero-cross detection pulse which passes the time window defined by said time window signal and outputting it as a time window detection pulse;

frequency computing means for computing detection frequency of said time window detection pulse with respect to said zero-cross detection pulse;

frequency determination means for determining whether a data signal is included in said input signal or not on the basis of the detection frequency of said time window detection pulse to output a data receive detection signal indicating a result of the determination;

a phase counter capable of setting of an initial phase, for performing counting operation at an integer multiple of a symbol rate of said input signal to cyclically output a phase value with a certain period;

mean phase computing means responsive to said time window detection pulse for accumulating the phase value outputted from said phase counter and computing a mean phase value thereof;

setting means for setting in said phase counter as said initial phase said mean phase value when said data receive detection signal changes from a no-detection state to a detection state of said data signal, and a steady phase value in the no-detection state portion, respectively; and clock generating means for generating said clock on the basis of the phase value outputted from said phase counter.

10. The clock recovery device according to claim 9, further comprising, phase correction means responsive to said zero-cross detection pulse for accumulating the phase value outputted from said phase counter to determine a leading phase, a lagging phase, or the same phase and output a correction phase value corresponding to the determination result, wherein said setting means sets said correction phase value as said initial phase in said phase counter when said data receive detection signal is in the detection state portion of said data signal.

11. The clock recovery device according to claim 9, wherein said mean phase computing means subtracts the phase value of said phase counter from a current mean phase value to obtain an absolute value of the difference, and adds the current mean phase value, the phase value of said phase counter and a phase value corresponding to one period of said phase counter and multiplies it by ½ to obtain a new mean phase value when the absolute value of the difference is not less than a phase value corresponding to ½ period of said phase counter, and adds the current mean phase value and the phase value of said phase counter and multiplies it by ½ to obtain a new mean phase value when the absolute value of the difference is smaller than a phase value corresponding to ½ period of said phase counter.

12. A clock recovery device for recovering from a data signal included in an input signal a clock synchronized with the data signal, comprising:

zero-cross detection means for extracting a zero-cross timing of said input signal to generate and output a zero-cross detection pulse;

a phase counter capable of setting of an initial phase, for performing counting operation at an integer multiple of a symbol rate of said input signal to cyclically output a phase value with a certain period;

first phase storage means for storing the phase value outputted from said phase counter as a first phase value in response to said zero-cross detection pulse;

second phase storage means for storing said first phase value of the last time as a second phase value in response to said zero-cross detection pulse;

center phase computing means for computing the center of phase from said first and second phase values to generate a first center phase value;

center phase storage means for storing said first center phase value of the last time as a second center phase value in response to said zero-cross detection pulse;

approximation detecting means for determining whether said first center phase value and said second center phase value are approximate or not to output an approximation detection pulse if they are approximate;

frequency computing means for computing detection frequency of said approximation detection pulse with respect to said zero-cross detection pulse;

frequency determination means for determining whether a data signal is included in said input signal or not on the basis of the detection frequency of said approximation detection pulse and outputting a data receive detection signal indicating a result of the determination;

mean phase confuting means responsive to said approximation detection pulse for accumulating said first center phase value and computing a mean phase value thereof;

setting means for setting in said phase counter as said initial phase said mean phase value when said data receive detection signal changes from a no-detection state to a detection state of said data signal, and a steady phase value in the no-detection state portion, respectively; and clock generating means for generating said clock on the basis of the phase value outputted from said phase counter.

13. The clock recovery device according to claim 12, further comprising, phase correction means responsive to said approximation detection pulse for accumulating the phase value outputted from said phase counter to determine a leading phase, a lagging phase, or the same phase and outputting a correction phase value corresponding to the determination result, wherein said setting means sets said correction phase value as said initial phase in said phase counter when said data receive detection signal is in the detection state portion of said data signal.

14. The clock recovery device according to claim 12, wherein said center phase computing means subtracts said second phase value from said first phase value to obtain an absolute value of the difference, and adds said first phase value, said second phase value and phase value corresponding to one period of said phase counter and multiplies it by ½ to obtain said first center phase value when the absolute value of the difference is not less than a phase value corresponding to ½ period of said phase counter, and adds said first phase value and said second phase value and multiplies it by ½ to obtain said first center phase value when the absolute value of the difference is smaller than a phase value corresponding to ½ period of said phase counter.

15. The clock recovery device according to claim 12, wherein said mean phase computing means subtracts said first center phase value from a current mean phase value to obtain an absolute value of the difference, and adds the current mean phase value and said first center phase value and a phase value corresponding to one period of said phase counter and multiplies it by ½ to obtain a new mean phase value when the absolute value of the difference is not less than a phase value corresponding to ½ period of said phase counter, and adds the current mean phase value and said first center phase value and multiplies it by ½ to obtain a new mean phase value when the absolute value of the difference is smaller than a phase value corresponding to ½ period of said phase counter.

16. A clock recovery device for recovering from a data signal included in an input signal a clock synchronized with the data signal, comprising: p1 zero-cross detection means for extracting a zero-cross timing of said input signal to generate and output a zero-cross detection pulse;

time window generating means for generating and outputting a time window signal defining a time window with a certain period on the basis of said zero-cross detection pulse for time reference;

time window detection means for extracting said zero-cross detection pulse which passes the time window defined by said time window signal and outputting it as a time window detection pulse;

a phase counter capable of setting of an initial phase, for performing counting operation at an integer multiple of a symbol rate of said input signal to cyclically output a phase value with a certain period;

first phase storage means for storing the phase value outputted from said phase counter as a first phase value in response to said time window detection pulse;

second phase storage means for storing said first phase value of the last time as a second phase value in response to said time window detection pulse;

center phase computing means for computing the center of phase from said first and second phase values to generate a first center phase value;

center phase storage means for storing said first center phase value of the last time as a second center phase value in response to said time window detection pulse;

approximation detecting means for determining whether said first center phase value and said second center phase value are approximate or not to output an approximation detection pulse if they are approximate;

frequency computing means for computing detection frequency of said approximation detection pulse relative to said zero-cross detection pulse;

frequency determination means for determining whether a data signal is included in said input signal or not on the basis of the detection frequency of said approximation detection pulse and outputting a data receive detection signal indicating a result of the determination;

mean phase computing means responsive to said approximation detection pulse for accumulating said first center phase value and computing a mean phase value thereof;

setting means for setting in said phase counter as said initial phase said mean phase value when said data receive detection signal changes from a no-detection state to a detection state of said data signal, and a steady phase value in the no-detection state portion respectively; and clock generating means for generating said clock on the basis of the phase value outputted from said phase counter.

17. The clock recovery device according to claim 16, further comprising, phase correction means responsive to said approximation detection pulse for accumulating the phase value outputted from said phase counter to determine a leading phase, a lagging phase, or the same phase and outputting a correction phase value corresponding to the determination result, wherein said setting means sets said correction phase value as said initial phase in said phase counter when said data receive detection signal is in the detection state portion of said data signal.

18. The clock recovery device according to claim 16, wherein said center phase computing means subtracts said second phase value from said first phase value to obtain an absolute value of the difference, and adds said first phase value, said second phase value and a phase value corresponding to one period of said phase counter and multiplies it by ½ to obtain said first center phase value when the absolute value of the difference is not less than a phase value corresponding to ½ period of said phase counter, and adds said first phase value and said second phase value and multiplies it by ½ to obtain said first center phase value when the absolute value of the difference is smaller than a phase value corresponding to ½ period of said phase counter.

19. The clock recovery device according to claim 16, wherein said mean phase computing means subtracts said first center phase value from a current mean phase value to obtain an absolute value of the difference, and adds the current mean phase value and said first center phase value and a phase value corresponding to one period of said phase counter and multiplies it by ½ to obtain a new mean phase value when the absolute value of the difference is not less than a phase value corresponding to ½ period of said phase counter, and adds the current mean phase value and said first center phase value and multiplies it by ½ to obtain a new mean phase value when the absolute value of the difference is smaller than a phase value corresponding to ½ period of said phase counter.

* * * * *